Sept. 3, 1935.    G. GERALDSON    2,013,629
TRACTOR CULTIVATOR
Filed Dec. 19, 1934    2 Sheets-Sheet 1
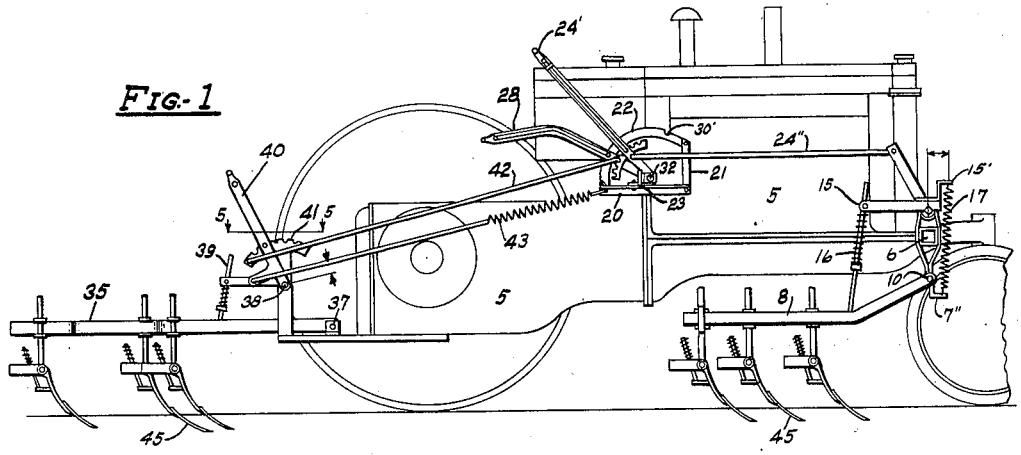
Fig.-1
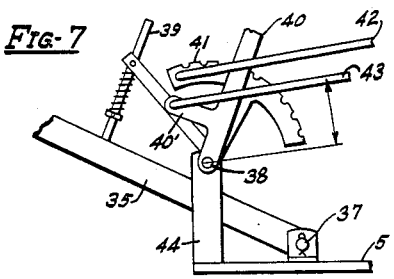
Fig.-7
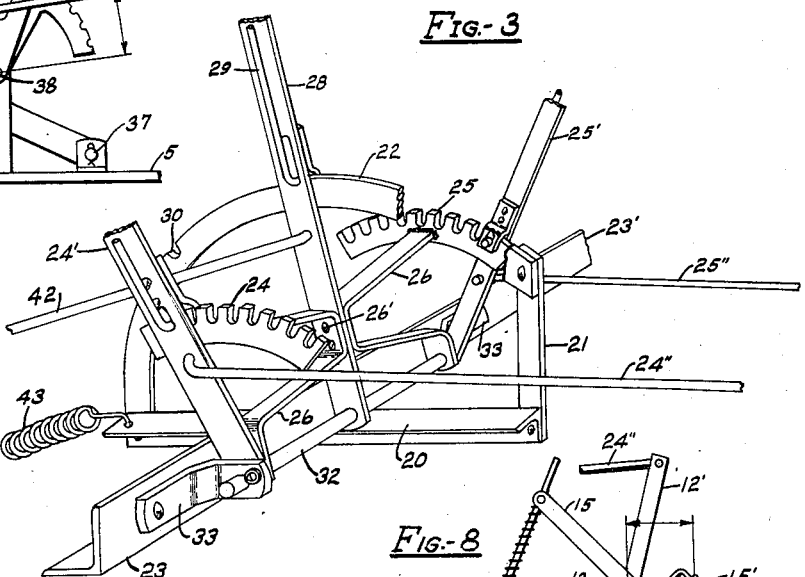
Fig.-3
Fig.-8
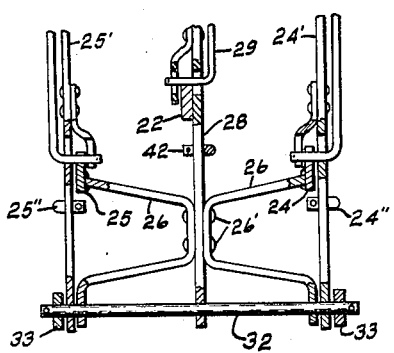
Fig.-4
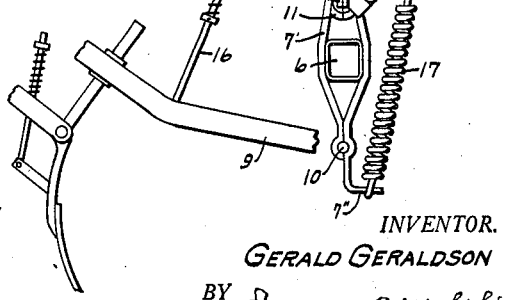
INVENTOR.
GERALD GERALDSON
BY James A. Walsh
ATTORNEY Sept. 3, 1935.  G. GERALDSON  2,013,629
TRACTOR CULTIVATOR
Filed Dec. 19, 1934  2 Sheets-Sheet 2
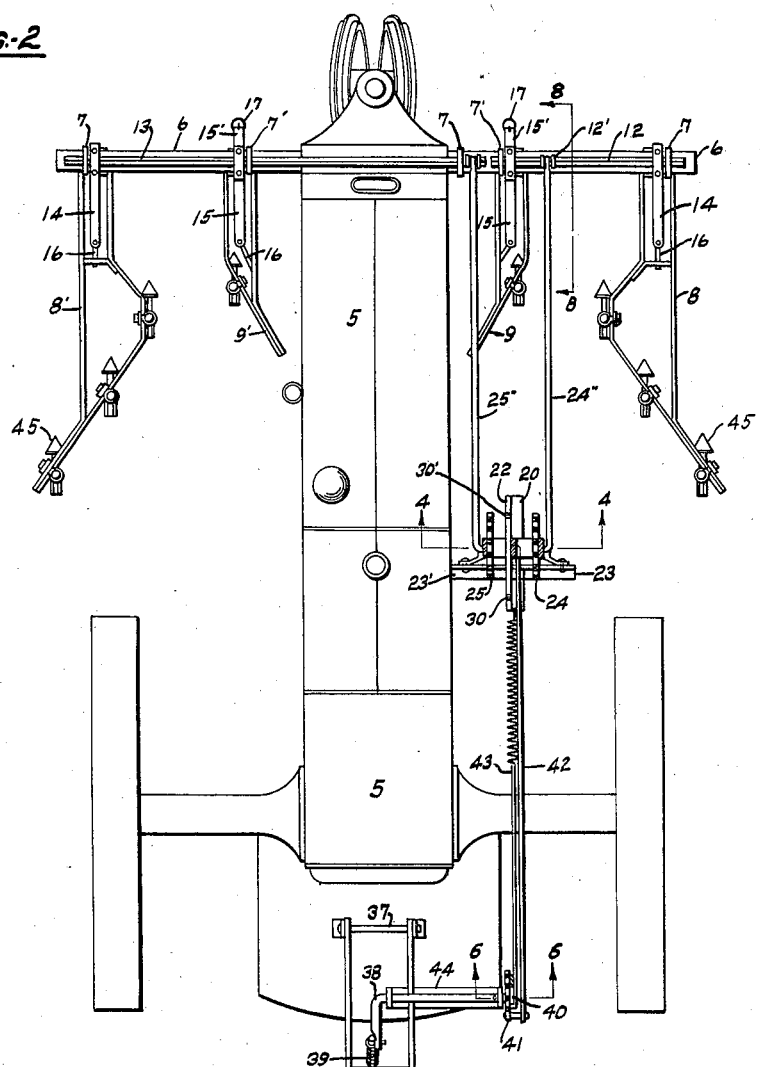
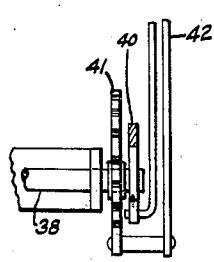
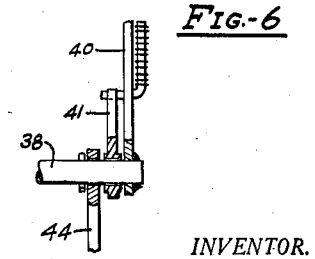
INVENTOR.
GERALD GERALDSON
BY James A. Walsh
ATTORNEY Patented Sept. 3, 1935

2,013,629

UNITED STATES PATENT OFFICE 2,013,629

TRACTOR CULTIVATOR

Gerald Geraldson, Racine, Wis., assignor to J. I. Case Company, Racine, Wis., a corporation Application December 19, 1934, Serial No. 758,186

5 Claims. (Cl. 97—47)

In the operation of tractor cultivators it is necessary to frequently adjust the front and rear tool carrying rigs either individually or collectively according to ground conditions, which adjustments are commonly effected by manually controlled levers and a power lifting device of a materially expensive character and actuated by the tractor. It is the object of my present invention to provide an improved lever and balancing systems for the purpose stated which are of comparatively simple and inexpensive construction and by which the various adjustments of the cultivator rigs may be manually readily controlled by the tractor operator with but slight effort and without the necessity of employing power lifting devices, as will further appear.

In the accompanying drawings, forming part hereof, Figure 1 is a side elevation of a tractor cultivator embodying my improvements; Fig. 2, a plan view of the implement; Fig. 3, a perspective view of the lever assemblage mounted upon one side of the tractor; Fig. 4, a detail taken on the dotted line 4—4 in Fig. 2; Fig. 5, an enlarged fragmentary detail taken on the dotted line 5—5 in Fig. 1; Fig. 6, a detail taken on the dotted line 6—6 in Fig. 2; Fig. 7, a fragmentary elevation of the rear rig controlling devices; and Fig. 8 is a fragmentary elevation of a forward rig and balancing devices therefor as seen when looking in the direction of the arrows 8—8 in Fig. 2.

In said drawings the numeral 5 indicates a tractor of well known construction having the usual transversely arranged rig support 6 carrying brackets 7, 7', to which the rigs 8, 9, and 8', 9' are pivotally connected, as at 10, said brackets including bearings 11 at their upper ends in which rock-shafts 12, 13, are mounted, the latter shaft being greater in length than shaft 12 and extending from one side of the tractor to a considerable distance beyond the opposite side, as clearly indicated in Fig. 2. Fixedly secured to rock-shafts 12, 13, are rig lifting-arms 14, 15, connected at their rear ends to the rigs 8, 9, by tension rods 16, the inner arms 15 having a keeper 15' thereon extending forwardly of the support 6 and each having a spring 17 attached thereto and to the lower end or foot 7" of bracket 7'.

At one side of the tractor a unitary lever assembly is mounted, comprising frame members 20, 21, connected by a master quadrant 22, and which member 20 is fastened to a support 23 the inner end 23' of which is secured to the tractor. At each side of the master quadrant 22 I position quadrants 24, 25, to each of which is secured by welding or otherwise a preferably U-shaped brace 26, Fig. 4, having a perforated lower end, and which braces are fastened at 26' by rivets or otherwise to a master lever 28 operatively engaging the master quadrant 22 by the usual spring-controlled detent 29 adapted to be engaged in the notches 30, 30', of said quadrant. The lower end of lever 28 is mounted on a rockshaft 32 supported in the braces 26, the ends of which shaft extend through levers 24', 25', respectively, of similar character as master lever 28, and which levers 24', 25', 28, are pivotally mounted on shaft 32, the ends of the latter being supported by brackets 33 secured to the cross support 23. As thus described and shown, Fig. 3, it will be seen that the lever and quadrant assembly is of a unitary character and adapted to be so installed on and removed from the tractor.

Upon the rear of the tractor I pivotally connect a rig 35, as by means of a rod 37, to which rig is secured a rocking crank-shaft 38 by a tension-rod 39, and which arm is connected to a lever 40 operatively engaging a quadrant 41, the rear end of the latter being coupled by a link 42 with the master lever 28, while an anchored tension-rod 43 is attached to an extension or ear 40' on lever 40, said crank-shaft, lever and quadrant being supported by standards 44 or otherwise. The lever 24' is connected by link 24" to a rocker arm 12' secured to rock-shaft 12, and lever 25' by the link 25" is connected to a similar arm secured to rock-shaft 13, for a purpose to appear.

In the position shown in Fig. 1 the master lever 28 is in its lowermost engagement with the master quadrant 22, at notch 30, and therefore the front and rear rigs have penetrated the shovels 45 to considerable depth to be so maintained until it is desired to withdraw and to decrease or increase the depth of the shovels, which withdrawal is quickly accomplished by shifting said lever forwardly to its second engagement with the master quadrant, at 30', as shown in Fig. 1, which movement through the link 42 raises the rear rig 35 and through the links 24", 25", raises the forward rigs 8, 9. It will be noted that the tension-rod 43 has but slight leverage from its pivotal point 38 in the position shown in Fig. 1 compared with its increased leverage when the lever 40 is in the position shown in Fig. 7, as indicated by the arrows, and that the arms 15' connected to the rock-shafts 12, 13, have but limited leverage as compared with their position when adjusted as indicated in Fig. 8 after the arms 12' have been actuated by the levers 24' and 25' to turn the rock-shafts 12, 13, forwardly, which leverage systems tend to balance the rigs during the vertical movements thereof and assist the levers in adjusting the rigs. In thus providing for increasingly wider ranges of leverage in relation to the rear and front rigs it will be understood that when it is desired to vertically adjust either of the rigs it is but necessary to throw the master lever 28 forwardly to engage notch 30' of the master quadrant 22, or it may be adjusted into neutral position between the notches 30, 30', in either of which occurrences the rear rig 35 may be vertically adjusted independently of the master lever by shifting lever 40 forwardly, which movement causes the rocking crank-shaft 38, which is secured to said lever, to raise the rig above the ground surface, or if it is necessary to have deeper penetration of the rear shovels than that indicated in Fig. 1 this is accomplished by throwing lever 40 rearwardly to engage the desired quadrant notch, which movement will force the shovels into maximum depth, or at variable depths between maximum and the ground surface as may be demanded by ground conditions. Likewise, either of the forward rigs 8, 9, and 8', 9', may be adjusted individually to obtain variable depths by manipulating levers 24', 25'. In this manner the tractorman may readily predetermine the depths to which it is desirable to penetrate the shovels of each rig, that is, whether they shall be of uniform or varied depths to suit soil conditions; in other words, if conditions in the path of rigs 8', 9', are such as to require shallow cultivation the rigs may be adjusted accordingly by shifting lever 25' forwardly as indicated in Fig. 3, and when such condition has been passed and deeper penetrations are advisable the rigs can be adjusted accordingly by reversing the movement of lever 25'. As lever 24' and the rigs 8, 9, controlled thereby are similarly constructed and mounted it will be apparent that the same manipulations and operations may be as readily controlled. It will thus be seen that each rig may be adjusted independenly of the others and of the master lever, and that when it is desired to raise or lower all of the rigs simultaneously it is but necessary to return the master lever to its lowermost engagement with quadrant 22, when such rigs and the shovels thereof will occupy the cultivating position indicated in Fig. 1. It will also be understood that by controlling the rigs with the master lever to be simultaneously raised a considerable distance above the ground when the implement reaches the end of a row the vertical adjustment of the rigs relieves the tractor from frictional engagement with the ground by the shovels so that it can be quickly and shortly turned for proceeding through the next rows; and further, by reason of the unitary assemblage of the plurality of levers at one side of the tractor (within convenient reach of the operator and readily controlled by one hand) and the links connected thereto and to the rigs, and the easily rocking motion of the combined levers and braces 26 on shaft 32, the entire vertically adjustable equipment moves in unison with but slight effort by the attendant who is thus enabled to quickly make required adjustments manually without power from the tractor. The forward rigs are securely mounted but sensitively balanced by means of bracket 7', the rig arms 15, 15', and spring 17, so that the raising and lowering of the rigs is instantly responsive to the movement of rocker-arm 12' as leverage of arm 15' is increased in its movements, indicated by the arrows, Figs. 1 and 8, to compensate for the expansion and contraction of spring 17, which minimizes the pushing and pulling strains on links 24'' and 25'', while the leverage explained respecting the rear lever 40 materially lessens strains upon the parts associated therewith.

I claim as my invention:

1. In a tractor cultivator, a unitary lever assembly comprising a frame, means for connecting the frame to the tractor, a master quadrant connected to the frame, a master lever engageable with the quadrant, braces secured to opposite sides of the lever, quadrants secured to the braces, individual levers engageable with each of said last mentioned quadrants, a shaft upon which all of said levers are mounted to rock, forward rigs on the tractor, means connecting the individual levers to said rigs, a rear rig on the tractor, a lever connected to the rear rig, and means connecting the latter lever to the master lever whereby when the master lever is shifted the forward and rear rigs will become vertically adjusted.

2. In a tractor cultivator, a rear rig pivotally connected to the tractor, a support on the tractor, a rocking crank-shaft mounted on the support, means connecting the crank-shaft to the rig, a quadrant on said shaft, a lever on the shaft having an extension thereon and engageable with the quadrant for rocking the shaft to vertically adjust the rig, and an anchored tension-rod connected to the lever extension whereby when said lever is adjusted forwardly the leverage of said rod will be increased to assist the lever in raising the rig.

3. In a tractor cultivator, a support forwardly of the tractor and extending laterally thereof, a rock-shaft mounted on the support at one side of the tractor, a second rock-shaft on the support longer than the first mentioned rock-shaft and extending laterally beyond the opposite side of the tractor, cultivator rigs pivotally mounted on the support, a lever on one side of the tractor, means connecting the lever to the first rock-shaft for vertically adjusting the rigs associated therewith, cultivator rigs pivotally mounted on the support, a lever on the tractor, and means connecting the lever to the second rock-shaft for vertically adjusting the rigs associated therewith, said levers and connecting means being positioned at one side of the tractor in parallel relation to each other.

4. In a tractor cultivator having a rig support, rock-shafts on the support, cultivator rigs at opposite sides of the tractor and connected to the support, lifting-arms on the rock-shafts, means connecting each rig to an arm, levers supported on one side of the tractor, a link connecting each lever to a rock-shaft whereby the rig associated with the rock-shaft may be vertically adjusted independently of the opposite rig, and a master lever assembled with said levers for vertically adjusting said rigs simultaneously.

5. In a tractor cultivator having a forward rig support, a rock-shaft on the support, a cultivator rig pivotally connected to the support, a lifting-arm on the rock-shaft, yielding means connecting the rig and arm, a rocker-arm on said shaft, a lever supported on the tractor, a link connecting the rocker-arm and lever, yielding means secured to the lifting-arm for increasing the leverage of the latter when the rig is being raised from cultivating position, a rear rig pivotally connected to the tractor, a support on the rear of the tractor, a rocking crank-shaft mounted on the support, means connecting the crank-shaft to the rig, a quadrant on said shaft, a lever on the crank-shaft having an extension thereon and engageable with the quadrant for rocking the shaft to vertically adjust the rig, and an anchored tension-rod connected to the lever extension whereby when said lever is shifted forwardly the leverage of said rod will be increased to assist the lever in raising the rig.

GERALD GERALDSON.